US012674057B2

(12) United States Patent
Beyer et al.

(10) Patent No.: US 12,674,057 B2
(45) Date of Patent: Jul. 7, 2026

(54) HYDROSILYLATION CURE INHIBITORS AND USE THEREOF

(71) Applicants: DOW SILICONES CORPORATION, Midland, MI (US); DOW TORAY CO., LTD., Tokyo (JP)

(72) Inventors: Patrick Beyer, Wiesbaden (DE); Michael Backer, Wiesbaden (DE); Tomoko Tasaki, Ichihara-City (JP)

(73) Assignees: Dow Silicones Corporation, Midland, MI (US); Dow Toray Co., Ltd., Tokyo (JP)

(*) Notice: Subject to any disclaimer, the term of this patent is extended or adjusted under 35 U.S.C. 154(b) by 0 days.

(21) Appl. No.: 18/772,884

(22) Filed: Jul. 15, 2024

(65) Prior Publication Data

US 2024/0368402 A1 Nov. 7, 2024

Related U.S. Application Data

(63) Continuation of application No. 18/038,826, filed as application No. PCT/US2021/060443 on Nov. 23, 2021, now Pat. No. 12,071,543.

(60) Provisional application No. 63/119,152, filed on Nov. 30, 2020.

(51) Int. Cl.

| | |
|---|---|
| ***C08L 83/04*** | (2006.01) |
| ***B29C 64/106*** | (2017.01) |
| ***C08G 77/08*** | (2006.01) |
| ***C09D 183/04*** | (2006.01) |
| *B33Y 10/00* | (2015.01) |
| *B33Y 70/00* | (2020.01) |
| *C08G 77/12* | (2006.01) |
| *C08G 77/20* | (2006.01) |

(52) U.S. Cl.

CPC ............ *C08L 83/04* (2013.01); *B29C 64/106* (2017.08); *C08G 77/08* (2013.01); *C09D 183/04* (2013.01); *B33Y 10/00* (2014.12); *B33Y 70/00* (2014.12); *C08G 77/12* (2013.01); *C08G 77/20* (2013.01)

(58) Field of Classification Search

CPC ........... C08K 5/10; C08K 5/101; C08K 5/103

See application file for complete search history.

(56) References Cited

U.S. PATENT DOCUMENTS

| | | | |
|---|---|---|---|
| 3,419,593 | A | 12/1968 | Willing |
| 3,445,420 | A | 5/1969 | Kookootsedes et al. |
| 3,715,334 | A | 2/1973 | Karstedt |
| 3,814,730 | A | 6/1974 | Karstedt |
| 3,989,667 | A | 11/1976 | Lee et al. |
| 4,533,575 | A | 8/1985 | Melancon |
| 5,504,174 | A | 4/1996 | Onishi |
| 6,605,734 | B2 | 8/2003 | Roy et al. |
| 2005/0038217 | A1 | 2/2005 | Ahn et al. |
| 2005/0089696 | A1 | 4/2005 | Bosshammer |
| 2006/0276600 | A1 | 12/2006 | Aketa et al. |
| 2007/0275255 | A1 | 11/2007 | Ooms et al. |
| 2011/0178198 | A1 | 7/2011 | Backer et al. |
| 2014/0179863 | A1 | 6/2014 | Kato |
| 2019/0040204 | A1 | 2/2019 | Beyer et al. |
| 2021/0054199 | A1 | 2/2021 | Tasaki et al. |
| 2021/0222008 | A1 | 7/2021 | Ihara et al. |
| 2022/0372304 | A1 | 11/2022 | Fisher et al. |
| 2023/0092246 | A1 | 3/2023 | Hornig et al. |
| 2023/0312925 | A1* | 10/2023 | Smith ..................... C08L 83/04 528/35 |
| 2023/0392012 | A1 | 12/2023 | Beyer et al. |

FOREIGN PATENT DOCUMENTS

| | | | |
|---|---|---|---|
| EP | 0545591 | A1 | 6/1993 |
| JP | 2007009189 | A | 1/2007 |
| JP | 2009109579 | A | 5/2009 |
| JP | 2009155442 | A | 7/2009 |
| WO | 2005012432 | A1 | 2/2005 |
| WO | 2018003511 | A1 | 1/2018 |
| WO | 2019061290 | A1 | 4/2019 |
| WO | 2019131081 | A1 | 7/2019 |
| WO | 2019232778 | A1 | 12/2019 |

OTHER PUBLICATIONS

International Search Report for PCT/US2021/060443 dated Mar. 10, 2022, 4 pages.

International Search Report for PCT/US2021/037550 dated Oct. 22, 2021, 3 pages.

Tatrishvili, "Hydrosilylation Reactions of Polymethylhydrosiloxane with Acrylates and Methacrylates and Solid Polymer Electrolyte Membranes on their Basis" 2015, vol. 38, No. 2, p. 776-788.

Machine-assisted translation of JP2009109579A obtained from https://patents.google.com/ on Feb. 13, 2024, 15 pages.

Machine-assisted translation of JP2009155442A obtained from https://patents.google.com/ on Feb. 13, 2024, 13 pages.

* cited by examiner

*Primary Examiner* — Marc S Zimmer

(74) *Attorney, Agent, or Firm* — Warner Norcross + Judd LLP

(57) ABSTRACT

The present disclosure relates to hydrosilylation curable silicone rubber compositions having polyorganosiloxane cross-linkers containing at least two or at least three terminal silicon bonded hydrogen groups and one or more hydrosilylation cure inhibitor compounds selected from multiacrylates having at least three acrylate groups per molecule. Cured products resulting from the cure of such compositions and which may include elastomeric products are also disclosed.

11 Claims, No Drawings

HYDROSILYLATION CURE INHIBITORS AND USE THEREOF

CROSS-REFERENCE TO RELATED APPLICATIONS

This application is a continuation of U.S. application Ser. No. 18/038,826 filed on 25 May 2023, which is the U.S. National Stage of PCT/US2021/060443 filed on 23 Nov. 2021, which claims priority to and all advantages of U.S. Provisional Application No. 63/119,152 filed on 30 Nov. 2020, the content of which is incorporated herein by reference.

The present disclosure relates to hydrosilylation curable silicone compositions comprising inhibitor compounds suitable for inhibiting the curing of a hydrosilylation curable silicone composition. The inhibitor compounds are multi-acrylates which contain at least three acrylate groups per molecule. Cured materials which are the products of curing such compositions including, for example, elastomeric materials are also disclosed herein.

One of the most important methods of curing silicone rubber compositions is via the hydrosilylation (otherwise referred to as addition cure) reaction pathway in which polyorganosiloxane polymers e.g. polydiorganosiloxane polymers having unsaturated organic groups, typically alkenyl groups and/or alkynyl groups react with one or more cross-linking molecules containing multiple silicone bonded hydrogen (—Si—H) bonds in the presence of a suitable curing agent. The curing agents are usually selected from the platinum metal group (platinum, ruthenium, osmium, rhodium, iridium and palladium), or a compound of one or more of such metals. Platinum and rhodium compounds are preferred due to the high activity level of these catalysts in hydrosilylation reactions.

In the presence of many of these curing agents, especially platinum and rhodium compounds, curing will begin as soon as the above ingredients are mixed together, even at room temperature. The rapidity of this reaction leads to the need for preventative measures to give some control over the reaction process. These tend to include long term storage of the composition in multiple parts (two-part compositions being the most common, one of which contains the unsaturated polysiloxane and the hydrosilation catalyst, and the other the organohydrogenpolysiloxane crosslinking agent).

Additionally or alternatively, when required cure inhibitors are incorporated into the composition to provide further control over the cure process. The cure inhibitors may be stored in either or both of such two-part compositions providing they are not negatively affected by other ingredients in the part concerned, but usually are present in the part containing the cross-linker. The hydrosilylation inhibitor can effectively inhibit or retard the catalyst from catalyzing the hydrosilylation reaction. However, once the hydrosilylation inhibitor loses its inhibitory function, the hydrosilylation reaction occurs rapidly. Hence, the composition can be stored for a lengthy period of time, especially when divided into two parts at room temperature or thereabouts.

A wide variety of cure inhibitors have been proposed. These include dialkyl formamides, thioamides, alkyl thioureas; organophosphorous compounds; benzotriazoles; nitriles; acetylenic alcohols; tris-triorganosilyl amines; tetramethylguanidine carboxylates; aminoalkylalkoxysilanes; isocyanurates; diaziridines; higher alkyl amines; dialkyl maleic esters; and dialkylacetylene dicarboxylates. Of these acetylenic alcohol compounds such as ethynyl cyclohexanol (ETCH) are the most commonly used. With these systems fast curing speeds at elevated temperatures (seconds to minutes), combined with long pot-lives at room temperature (several hours up to days) can be achieved.

It is known for acrylic compounds or methacrylic compounds and derivatives such as alkylene glycol esters e.g., an alkylene glycol ester of diacrylic acid or an alkylene glycol ester of dimethacrylic acid, to be used in hydrosilylation curable silicone rubber compositions for increasing the adhesive nature thereof (adhesion promoters). Furthermore, it is also known that acrylates when present in hydrosilylation curable silicone rubber compositions are chemically able to participate in the hydrosilylation reaction (e.g., with the silicon bonded hydrogen groups (—Si—H)) in cross-linkers and are thus crosslinked into the silicone elastomer during cure. Whilst this covalent linkage to the cross-linked silicone matrix is beneficial for achieving strong adhesion, current theories suggest that acrylates can strongly interfere with hydrosilylation cure, making inhibition of those systems via traditional approaches challenging.

Unexpectedly given the above, it has now been identified that whilst compounds with one or two acrylate groups are suitable for use as adhesion promoters, compounds having more than two, i.e. at least three acrylate groups per molecule function as hydrosilylation cure inhibitors specifically for hydrosilylation curable silicone rubber compositions wherein the cross-linker used in the composition is a polyorganosiloxane having three or more silicon bonded hydrogen (—Si—H) groups per molecule wherein each —Si—H group is a terminal —Si—H group, sometimes described as an M(H) group.

There is provided a hydrosilylation curable silicone composition comprising:

(A) one or more polyorganosiloxanes containing at least two unsaturated groups per molecule, which unsaturated groups are selected from alkenyl and alkynyl groups and having a viscosity in a range of 1000 mPa·s to 200,000 mPa·s at 25° C.;

(B) a polyorganosiloxane containing at least two or alternatively at least three terminal silicon bonded hydrogen groups (—Si—H), (C) at least one hydrosilylation catalyst, (D) a hydrosilylation cure inhibitor consisting or comprising a multiacrylate compound having at least three acrylate groups per molecule.

There is also provided a silicone elastomer which is the cured product of the above hydrosilylation curable silicone composition.

There is also provided herein the use of a multiacrylate compound having at least three acrylate groups per molecule as a hydrosilylation cure inhibitor (D) in compositions otherwise comprising (A) one or more polyorganosiloxanes containing at least two unsaturated groups per molecule, which unsaturated groups are selected from alkenyl and alkynyl groups and having a viscosity in a range of 1000 mPa·s to 200,000 mPa·s at 25° C.;

(B) a polyorganosiloxane containing at least two or alternatively at least three terminal silicon bonded hydrogen groups (—Si—H), and (C) at least one hydrosilylation catalyst.

It was surprisingly found that whilst monoacrylate molecules, diacrylate molecules and methacrylates appear to function well as adhesion promoters they do not appear to have any inhibitory and/or retarding effect on hydrosilylation cure compositions comprising component (B) herein, whilst the multiacrylates having at least three acrylate groups per molecule of component (D) as described herein do. Hence, for the avoidance of doubt component (D) herein does not consist of monoacrylates, diacrylates or methacrylates.

Furthermore, component (B) does not consist of cross-linkers which only contain non-terminal silicon-bonded hydrogen groups sometimes referred to as D(H) groups.

Component (A)

Component (A) is a polyorganosiloxane such as a polydiorganosiloxane having at least two unsaturated groups per molecule, which unsaturated groups are selected from alkenyl groups, alkynyl groups or a mixture of alkenyl and alkynyl groups. Alternatively, component (A) has at least three unsaturated groups per molecule selected from alkenyl groups, alkynyl groups or a mixture of alkenyl and alkynyl groups.

The unsaturated groups of component (A) may be terminal, pendent, or in both locations in component (A). For example, the unsaturated group may be an alkenyl group and/or an alkynyl group. Alkenyl groups may have 2 to 30, alternatively 2 to 24, alternatively 2 to 20, alternatively 2 to 12, alternatively 2 to 10, and alternatively 2 to 6 carbon atoms. Alkenyl is exemplified by, but not limited to, vinyl, allyl, methallyl, propenyl, and hexenyl groups. Alkynyl groups may have 2 to 30, alternatively 2 to 24, alternatively 2 to 20, alternatively 2 to 12, alternatively 2 to 10, and alternatively 2 to 6 carbon atoms. Alkynyl may be exemplified by, but not limited to, ethynyl, propynyl, and butynyl groups.

Component (A) has multiple units of the formula (I):

$$R_aSiO_{(4-a)/2} \quad \text{(I)}$$

in which each R is independently selected from an aliphatic hydrocarbyl, aromatic hydrocarbyl, or organyl group (that is any organic substituent group, regardless of functional type, having one free valence at a carbon atom). Saturated aliphatic hydrocarbyls are exemplified by, but not limited to alkyl groups such as methyl, ethyl, propyl, pentyl, octyl, undecyl, and octadecyl and cycloalkyl groups such as cyclohexyl. Unsaturated aliphatic hydrocarbyls are exemplified by, but not limited to the alkenyl groups and alkynyl groups described above. Aromatic hydrocarbon groups are exemplified by, but not limited to, phenyl, tolyl, xylyl, benzyl, styryl, and 2-phenylethyl. Organyl groups are exemplified by, but not limited to, halogenated alkyl groups (excluding fluoro containing groups) such as chloromethyl and 3-chloropropyl; nitrogen containing groups such as amino groups, amido groups, imino groups, imido groups; oxygen containing groups such as polyoxyalkylene groups, carbonyl groups, alkoxy groups and hydroxyl groups. Further organyl groups may include sulfur containing groups, phosphorus containing groups, boron containing groups. The subscript "a" is 0, 1, 2 or 3.

Siloxy units may be described by a shorthand (abbreviated) nomenclature, namely—"M," "D," "T," and "Q", when R is a methyl group (further teaching on silicone nomenclature may be found in Walter Noll, Chemistry and Technology of Silicones, dated 1962, Chapter I, pages 1-9). The M unit corresponds to a siloxy unit where a=3, that is $R_3SiO_{1/2}$; the D unit corresponds to a siloxy unit where a=2, namely $R_2SiO_{2/2}$; the T unit corresponds to a siloxy unit where a=1, namely $R_1SiO_{3/2}$; the Q unit corresponds to a siloxy unit where a=0, namely $SiO_{4/2}$. The polyorganosiloxane such as a polydiorganosiloxane of component (A) is substantially linear but may contain a proportion of however, there can be some branching due to the presence of T units (as previously described) within the molecule, hence the average value of a in structure (I) is about 2.

Examples of typical groups on component (A) include mainly alkenyl, alkynyl, alkyl, and/or aryl groups, alternatively alkenyl, alkyl, and/or aryl groups. The groups may be in pendent position (on a D or T siloxy unit) or may be terminal (on an M siloxy unit).

The silicon-bonded organic groups attached to component (A) other than alkenyl groups are typically selected from monovalent saturated hydrocarbon groups, which typically contain from 1 to 10 carbon atoms, and monovalent aromatic hydrocarbon groups, which typically contain from 6 to 12 carbon atoms, which are unsubstituted or substituted with the groups that do not interfere with curing of this inventive composition, such as halogen atoms. Preferred species of the silicon-bonded organic groups are, for example, alkyl groups such as methyl, ethyl, and propyl; and aryl groups such as phenyl.

Component (A) may be selected from polydimethylsiloxanes, alkylmethylpolysiloxanes, alkylarylpolysiloxanes or copolymers thereof (where reference to alkyl means an alkyl group having two or more carbons) containing e.g. alkenyl and/or alkynyl groups and may have any suitable terminal groups, for example, they may be trialkyl terminated, alkenyldialkyl terminated alkynyldialkyl terminated or may be terminated with any other suitable terminal group combination providing each polymer contains at least two unsaturated groups selected from alkenyl and alkynyl groups per molecule. In one embodiment the terminal groups of such a polymer have no silanol terminal groups.

Hence component (A) may, for the sake of example, be:

a dialkylalkenyl terminated polydimethylsiloxane, e.g., dimethylvinyl terminated polydimethylsiloxane; a dialkylalkenyl terminated dimethylmethylphenylsiloxane, e.g., dimethylvinyl terminated dimethylmethylphenylsiloxane; a trialkyl terminated dimethylmethylvinyl polysiloxane; a dialkylvinyl terminated dimethylmethylvinyl polysiloxane copolymer; a dialkylvinyl terminated methylphenylpolysiloxane, a dialkylalkenyl terminated methylvinylmethylphenylsiloxane; a dialkylalkenyl terminated methylvinyldiphenylsiloxane; a dialkylalkenyl terminated methylvinyl methylphenyl dimethylsiloxane; a trimethyl terminated methylvinyl methylphenylsiloxane; a trimethyl terminated methylvinyl diphenylsiloxane; or a trimethyl terminated methylvinyl methylphenyl dimethylsiloxane.

In these embodiments, at a temperature of 25° C., the polyorganosiloxane of component A, such as a polydiorganosiloxane having at least two unsaturated groups per molecule, is typically a flowable liquid. Generally, the polyorganosiloxane of component A, has a viscosity of from 1000 mPa·s to 200,000 mPa·s at 25° C., alternatively 1000 mPa·s to 150,000 mPa·s at 25° C., alternatively 1000 mPa·s to 100,000 mPa·s at 25° C., alternatively 1000 mPa·s to 75,000 mPa·s at 25° C. Viscosity may be measured at 25° C. using either a Brookfield™ rotational viscometer with spindle LV-4 (designed for viscosities in the range between 1,000-2,000,000 mPa·s) or a Brookfield™ rotational viscometer with spindle LV-1 (designed for viscosities in the range between 15-20,000 mPa·s) for viscosities less than 1000 mPa·s and adapting the speed i.e. shear rate according to the polymer viscosity, for example from 0.005 $s^{-1}$ to 1 $s^{-1}$ (0.3 to 60 rpm) with, in this instance, 1 $s^{-1}$ preferred.

Component (B) is a cross-linker in the form of a polyorganosiloxane containing at least two or alternatively at least three terminal silicon bonded hydrogen (—Si—H) groups per molecule. By having at least two or alternatively at least three terminal —Si—H groups we mean having least two or alternatively at least three M units, that is $R_3SiO_{1/2}$ units, where one R is hydrogen. This is sometimes identified as M(H) in the literature.

Component (B) normally contains three or more terminal —Si—H groups so that the hydrogen atoms can react with the unsaturated alkenyl or alkynyl groups of component (A) to form a network structure therewith and thereby cure the composition. Some or all of Component (B) may alternatively have two terminal —Si—H groups per molecule particularly when component (A) has greater than (>) two alkenyl or alkynyl groups per molecule.

The molecular configuration of the polyorganosiloxane containing at least 2 or 3 terminal —Si—H groups per molecule (B) is not specifically restricted, and it can be a straight chain, a straight chain with some branching, cyclic or silicone resin based.

Silicon-bonded organic groups used in component (B) may be exemplified by methyl, ethyl, propyl, butenyl, pentenyl, hexyl, or similar alkyl groups; phenyl, tolyl, xylyl, or similar aryl groups; 3-chloropropyl, 3,3,3-trifluoropropyl, or similar halogenated alkyl group, preferable of which are methyl and phenyl groups.

Examples of the polyorganosiloxane containing at least 2 or 3 terminal (M(H)) silicon bonded hydrogen groups (—Si—H) groups per molecule (B) include but are not limited to:

(a) branched and/or chain extended dimethylhydrogensiloxy-terminated polydimethylsiloxanes, (b) dimethylhydrogensiloxy-terminated dimethylsiloxane-methylhydrogensiloxane copolymers, (c) copolymers and/or silicon resins consisting of $(CH_3)_2HSiO_{1/2}$ units, $(CH_3)_3SiO_{1/2}$ units and $SiO_{4/2}$ units, (d) copolymers and/or silicone resins consisting of $(CH_3)_2HSiO_{1/2}$ units and $SiO_{4/2}$ units, (e) copolymers and/or silicone resins consisting of $(CH_3)_2HSiO_{1/2}$ units, $SiO_{4/2}$ units and $(C_6H_5)_3SiO_{1/2}$ units, and alternatives in which methyl is replaced by phenyl groups or other alkyl groups.

Others include tetrakis(dimethylsiloxy)silane, hydride terminated, polyphenylmethyl siloxane hydride terminated, polyphenyl-(dimethylhydrosiloxy) siloxane, or phenyltris (dimethylsiloxy)silane or the like. Alternatively, component B, the cross-linker, may be a filler, e.g., silica treated with one of the above.

The polyorganosiloxane containing at least 2 or 3 terminal —Si—H groups per molecule (B) is typically added in an amount such that the molar ratio of the silicon-bonded hydrogen atoms in component (B) to that of all unsaturated groups in the composition is from 0.5:1 to 20:1; alternatively of from 0.5:1 to 5:1, alternatively from 0.6:1 to 3:1. When this ratio is less than 0.5:1, a well-cured composition will not be obtained. When the ratio exceeds 20:1, there is a tendency for the hardness of the cured composition to increase when heated.

The silicon-bonded hydrogen (Si—H) content of component (B) is determined using quantitative infra-red analysis in accordance with ASTM E168. In the present instance the silicon-bonded hydrogen to alkenyl (vinyl) and/or alkynyl ratio is important when relying on a hydrosilylation cure process. Generally, this is determined by calculating the total weight % of alkenyl groups in the composition, e.g., vinyl [V] and the total weight % of silicon bonded hydrogen [H] in the composition and given the molecular weight of hydrogen is 1 and of vinyl is 27 the molar ratio of silicon bonded hydrogen to vinyl is 27[H]/[V].

While the molecular weight of this component is not specifically restricted, the viscosity is typically from 15 to 50,000 mPa·s at 25° C. relying on using either a Brookfield™ rotational viscometer with spindle LV-4 (designed for viscosities in the range between 1,000-2,000,000 mPa·s) or a Brookfield™ rotational viscometer with spindle LV-1 (designed for viscosities in the range between 15-20,000 mPa·s) for viscosities less than 1000 mPa·s and adapting the speed i.e. shear rate according to the polymer viscosity, for example from 0.005 $s^{-1}$ to 1 $s^{-1}$ (0.3 to 60 rpm) with, in this instance, 1 $s^{-1}$ preferred.

Typically dependent on the number of unsaturated groups in component (A) and the number of Si—H groups in component (B), component (B) will be present in an amount of from 0.1 to 20% by weight of the total composition, alternatively from 0.5 to 20%, by weight of the total composition alternatively 0.5 to 10% by weight of the total composition, further alternatively from 0.5% to 5% by weight of the total composition.

Component (C) is at least one hydrosilylation (addition) cure catalyst. These are usually selected from catalysts of the platinum metal group (platinum, ruthenium, osmium, rhodium, iridium and palladium), or a compound of one or more of such metals. Platinum and rhodium compounds are preferred due to the high activity level of these catalysts in hydrosilylation reactions. Component (C) catalyses the reaction between the unsaturated e.g., alkenyl groups of component (A) and the Si—H groups of component (B) resulting in a cross-linked network when the hydrosilylation curable silicone compositions are cured to their respective elastomers.

The catalyst (C) can be a platinum group metal, a platinum group metal deposited on a carrier, such as activated carbon, metal oxides, such as aluminum oxide or silicon dioxide, silica gel or powdered charcoal, or a compound or complex of a platinum group metal.

Examples of preferred hydrosilylation catalysts (C) are platinum-based catalysts, for example, platinum black, platinum oxide (Adams catalyst), platinum on various solid supports, chloroplatinic acids, alcohol solutions of chloroplatinic acid, and complexes of chloroplatinic acid with ethylenically unsaturated compounds such as olefins and organosiloxanes containing ethylenically unsaturated silicon-bonded hydrocarbon groups. Soluble platinum compounds that can be used include, for example, the platinum-olefin complexes of the formulae $(PtCl_2 \cdot (olefin))_2$ and $H(PtCl_3 \cdot olefin)$, preference being given in this context to the use of alkenes having 2 to 8 carbon atoms, such as ethylene, propylene, isomers of butene and of octene, or cycloalkanes having five to seven carbon atoms, such as cyclopentene, cyclohexene, and cycloheptene. Other soluble platinum catalysts are, for the sake of example a platinum-cyclopropane complex of the formula $(PtCl_2C_3H_6)_2$, the reaction products of hexachloroplatinic acid with alcohols, ethers, and aldehydes or mixtures thereof, or the reaction product of hexachloroplatinic acid with methylvinylcyclotetrasiloxane in the presence of sodium bicarbonate in ethanolic solution. Platinum catalysts with phosphorus, sulfur, and amine ligands can be used as well, e.g., $(Ph_3P)_2PtCl_2$; and complexes of platinum with vinylsiloxanes, such as sym-divinyltetramethyldisiloxane.

Hence, specific examples of suitable platinum-based catalysts include (i) complexes of chloroplatinic acid with organosiloxanes containing ethylenically unsaturated hydrocarbon groups are described in U.S. Pat. No. 3,419,593;

(ii) chloroplatinic acid, either in hexahydrate form or anhydrous form;

(iii) a platinum-containing catalyst which is obtained by a method comprising reacting chloroplatinic acid with an aliphatically unsaturated organosilicon compound, such as divinyltetramethyldisiloxane;

(iv) alkene-platinum-silyl complexes as described in U.S. Pat. No. 6,605,734 such as $(COD)Pt(SiMeCl_2)_2$ where "COD" is 1,5-cyclooctadiene; and/or (v) Karstedt's catalyst, a platinum divinyl tetramethyl disiloxane complex typically containing about 1 wt. % of platinum in a solvent, such as toluene may be used. These are described in U.S. Pat. Nos. 3,715,334 and 3,814,730.

The hydrosilylation catalyst (C) of the hydrosilylation curable silicone composition is present in the total composition in a catalytic amount, i.e., an amount or quantity sufficient to catalyse the addition/hydrosilylation reaction and cure the composition to an elastomeric material under the desired conditions. Varying levels of the hydrosilylation catalyst (C) can be used to tailor reaction rate and cure kinetics. The catalytic amount of the hydrosilylation catalyst (C) is generally between 0.01 ppm, and 10,000 parts by weight of platinum-group metal, per million parts (ppm), based on the weight of the composition; alternatively, between 0.01 and 5000 ppm; alternatively, between 0.01 and 3,000 ppm, and alternatively between 0.01 and 1,000 ppm. In specific embodiments, the catalytic amount of the catalyst may range from 0.01 to 1,000 ppm, alternatively 0.01 to 750 ppm, alternatively 0.01 to 500 ppm and alternatively 0.01 to 100 ppm of metal based on the weight of the composition. The ranges may relate solely to the metal content within the catalyst or to the catalyst altogether (including its ligands) as specified, but typically these ranges relate solely to the metal content within the catalyst. The catalyst may be added as a single species or as a mixture of two or more different species. Typically, dependent on the form/concentration in which the catalyst package is provided the amount of catalyst present will be within the range of from 0.001 to 3.0 wt. % of the composition.

Component (D) is a hydrosilylation cure inhibitor consisting or comprising of one or more multiacrylate compound comprising at least three acrylate groups per molecule. The multiacrylate having at least three acrylate groups per molecule of Component (D) is provided herein to function as a hydrosilylation cure inhibitor to inhibit and/or retard the hydrosilylation (addition) reaction process at room temperature to enhance process stability. The one or more multiacrylate compounds comprising at least three acrylate groups per molecule may contain from three to ten acrylate groups per molecule, for example, triacrylates, tetraacrylates, pentaacrylates and hexaacrylates alternatively from three to six acrylate groups per molecule, alternatively from three to five acrylate groups per molecule. For example, the one or more multiacrylate compounds comprising at least three acrylate groups may comprise the following:

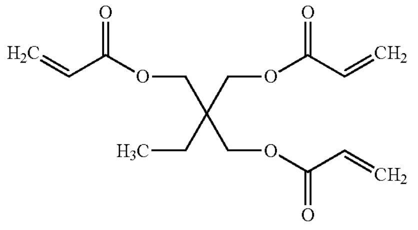

Trimethylolpropane triacrylate

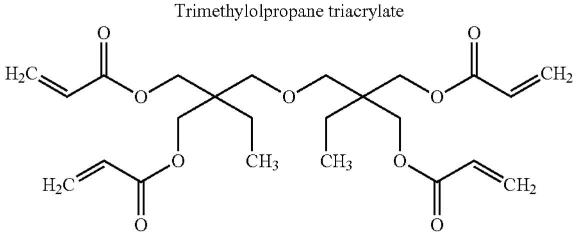

Di(trimethylolpropane) tetraacrylate

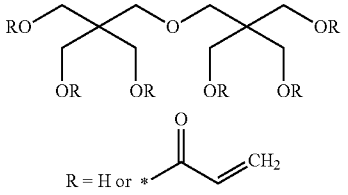

Dipentaerythritol penta-/hexa-acrylate

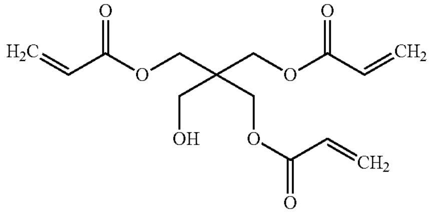

Pentaerythritol triacrylate

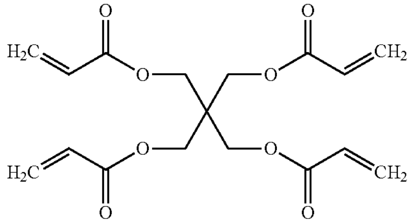

Pentaerythritol tetraacrylate

Dependent of the type of inhibitor present in the composition, the inhibitor concentrations as low as 1 mole of inhibitor per mole of the metal of catalyst will in some instances impart satisfactory retardancy of cure rate. In the case of e.g., component D herein, inhibitor concentrations of up to 2000 moles of inhibitor or even greater per mole of the metal of catalyst may be required. The optimum concentration for a given inhibitor in a given composition is readily determined by routine experimentation. The hydrosilylation cure inhibitor(s) present e.g., component D alone or in combination with one or more other hydrosilylation cure inhibitors is/are typically present in a total hydrosilylation cure inhibitor content of from 0.0125 to 10 wt. % of the composition, alternatively from 0.0125 to 5 wt. % of the composition, alternatively from 0.025 to 3 wt. % of the composition.

Optional additives may be present in the composition depending on the intended use of the curable silicone elastomer composition. Examples include one or more standard hydrosilylation cure inhibitors, fillers, adhesion promoters, mold releasing agents, adhesion catalysts, antioxidants and/or pigments and/or colourants. Other additives might include electrically conductive fillers, thermally conductive fillers, pot life extenders, flame retardants, lubricants, mold release agents, UV light stabilizers, bactericides, wetting agents, heat stabilizers, compression set additives and plasticizers or the like.

The multiacrylate having at least three acrylate groups per molecule of component (D) need not be the only hydrosilylation cure inhibitor. Other standard hydrosilylation cure inhibitors may additionally be present in composition described herein. These may include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, diaziridines and alkenyl-substituted siloxanes as described in U.S. Pat. No. 3,989,667 may be used, e.g., cyclic methylvinylsiloxanes.

One class of known hydrosilylation cure inhibitor includes the acetylenic compounds disclosed in U.S. Pat. No. 3,445,420. Acetylenic alcohols such as 2-methyl-3-butyn-2-ol constitute a preferred class of hydrosilylation cure inhibitors that will suppress the activity of a platinum-containing catalyst at 25° C. Compositions containing these hydrosilylation cure inhibitors typically require heating at temperature of 70° C. or above to cure at a practical rate.

Examples of acetylenic alcohols and their derivatives include 1-ethynyl-1-cyclohexanol (ETCH), 2-methyl-3-butyn-2-ol, 3-butyn-1-ol, 3-butyn-2-ol, propargyl alcohol, 1-phenyl-2-propyn-1-ol, 3,5-dimethyl-1-hexyn-3-ol, 1-ethynylcyclopentanol, 3-methyl-1-penten-4-yn-3-ol, and mixtures thereof. Derivatives of acetylenic alcohol may include those compounds having at least one silicon atom.

When standard hydrosilylation cure inhibitors are present in addition to the multiacrylate having at least three acrylate groups per molecule of component (D) herein the total amount of hydrosilylation cure inhibitors present will remain from 0.0125 to 10% alternatively from 0.0125 to 5 wt. % of the composition, alternatively from 0.025 to 3 wt. % of the composition by weight of the composition.

The composition may also comprise one or more reinforcing fillers, which are preferably finely divided, one or more non-reinforcing fillers or a mixture thereof.

When present, the reinforcing fillers of maybe exemplified by finely divided fumed silica and/or a finely divided precipitated silica and/or suitable silicone resins.

Precipitated silica, fumed silica and/or colloidal silicas are particularly preferred because of their relatively high surface area, which is typically at least 50 $m^2/g$ (BET method in accordance with ISO 9277: 2010). Fillers having surface areas of from 50 to 450 $m^2/g$ (BET method in accordance with ISO 9277: 2010), alternatively of from 50 to 400 $m^2/g$ (BET method in accordance with ISO 9277: 2010), are typically used. All these types of silica are commercially available.

Typically such reinforcing fillers are naturally hydrophilic (e.g., untreated silica fillers) and are therefore usually treated with a treating agent to render them hydrophobic. These surface modified reinforcing fillers do not clump and can be homogeneously incorporated into the polyorganosiloxane of component (A), as the surface treatment makes the fillers easily wetted by component (A).

The reinforcing fillers may be surface treated with any low molecular weight organosilicon compounds disclosed in the art applicable to make the fillers easier to handle and obtain a homogeneous mixture with the other ingredients and prevent creping of organosiloxane compositions during processing. For example, organosilanes, polydiorganosiloxanes, or organosilazanes e.g., hexaalkyl disilazane, short chain siloxane diols to render the filler(s) hydrophobic and therefore easier to handle and obtain a homogeneous mixture with the other ingredients. Specific examples include, but are not restricted to, silanol terminated trifluoropropylmethylsiloxane, silanol terminated vinyl methyl (ViMe) siloxane, silanol terminated methyl phenyl (MePh) siloxane, liquid hydroxyldimethyl-terminated polydiorganosiloxane containing an average from 2 to 20 repeating units of diorganosiloxane in each molecule, hydroxyldimethyl terminated Phenylmethyl Siloxane, hexaorganodisiloxanes, such as hexamethyldisiloxane, divinyltetramethyldisiloxane; hexaorganodisilazanes, such as hexamethyldisilazane (HMDZ), divinyltetramethyldisilazane and tetramethyldi(trifluoropropyl)disilazane; hydroxyldimethyl terminated polydimethylmethylvinyl siloxane, octamethyl cyclotetrasiloxane, and silanes including but not limited to methyltrimethoxysilane, dimethyldimethoxysilane, vinyltrimethoxysilane, methyltriethoxysilane, vinyltriethoxysilane, chlrotrimethyl silane, dichlrodimethyl silane, trichloromethyl silane.

A small amount of water can be added together with the silica treating agent(s) as processing aid.

The surface treatment may take place before introduction of the fillers into the composition or alternatively may be undertaken in-situ, usually during the preparation of a base material substantially comprising polyorganosiloxane component (A) and said fillers.

When present, the reinforcing filler is present in an amount of from 2.5 to 40 wt. % of the composition, alternatively of from 5.0 to 35 wt. % of the composition, alternatively of from 7.5 to 35 wt. % of the composition.

Non-reinforcing fillers may alternatively or additionally be included in the composition herein. These may include, for the sake of example, crushed quartz, diatomaceous earths, barium sulphate, iron oxide, titanium dioxide and carbon black, talc, wollastonite, aluminite, calcium sulphate (anhydrite), gypsum, calcium sulphate, ground calcium carbonate, magnesium carbonate, clays such as kaolin, aluminium trihydroxide, magnesium hydroxide (brucite), graphite, copper carbonate, e.g., malachite, nickel carbonate, e.g., zarachite, barium carbonate, e.g., witherite and/or strontium carbonate e.g. strontianite.

Other non-reinforcing fillers may include, aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluninosilicates comprise ground silicate minerals, such as but not limited to, sillimanite; $Al_2SiO_5$; mullite; $3Al_2O_3{\cdot}2SiO_2$; kyanite; and $Al_2SiO_5$. Ring silicates may be utilised as non-reinforcing fillers, these include silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$. Sheet silicates may alternatively or additionally be used as non-reinforcing fillers where appropriate group comprises silicate minerals, such as but not limited to, mica; $K_2Al_{14}[Si_6Al_2O_{20}](OH)_4$; pyrophyllite; $Al_4[Si_8O_{20}](OH)_4$; tale; $Mg_6[Si_8O_{20}](OH)_4$; serpentine for example, asbestos; Kaolinite; $Al_4[Si_4O_{10}](OH)_8$; and vermiculite. In one alternative the fillers will be selected from one or more of fumed silica, precipitated silica, calcium carbonate, talc, mica, quartz and aluminium oxide.

The hydrosilylation curable silicone composition as described herein may also comprise an adhesion promoter. It is to be noted however that component D, the multiacrylates, will potentially additionally function as adhesion promoters and as such the use of component D as a hydrosilylation cure inhibitor can have the advantage of negating the need for an additional adhesion promoter. However, if required an additional adhesion promoter may be utilised in the composition. When present, the additional adhesion promoter may comprise one or more monoacrylates, diacrylates or methacrylates. Examples may include for diacrylates such as $C_{4-20}$ alkanediol diacrylate such as hexanediol diacrylate, heptanediol diacrylate, octanediol diacrylate, nonanediol diacrylate, and or undecanediol diacrylate. Examples of monoacrylates include alkoxysilanes containing methacrylic groups or acrylic groups such as methacryloxymethyl-trimethoxysilane, 3-methacryloxypropyl-trimethoxysilane, 3-methacryloxypropyl-methyldimethoxysilane, 3-methacryloxypropyl-dimethylmethoxysilane, 3-methacryloxypropyl-triethoxysilane, 3-methacryloxypropyl-methyldiethoxysilane, 3-methacryloxyisobutyl-trimethoxysilane, or a similar methacryloxy-substituted alkoxysilane; 3-acryloxypropyl-trimethoxysilane, 3-acryloxypropyl-methyldimethoxysilane, 3-acryloxypropyl-dimethyl-methoxysilane, 3-acryloxypropyl-triethoxysilane, or a similar acryloxy-substituted alkyl-containing alkoxysilane. In one embodiment, if desired the additional adhesion promoter, when present, does not include one or more monoacrylates, diacrylates or methacrylates.

Examples of epoxy-containing alkoxysilanes which may be used as adhesion promoter may include 3-glycidoxypropyl trimethoxysilane, 3-glycidoxypropyl triethoxysilane, 3-glycidoxypropyl methyldimethoxysilane, 4-glycidoxybutyl trimethoxysilane, 5,6-epoxyhexyl triethoxysilane, 2-(3,4-epoxycyclohexyl) ethyltrimethoxysilane, or 2-(3,4-epoxycyclohexyl) ethyltriethoxysilane.

Adhesion catalysts, i.e., condensation catalysts used to activate and/or accelerate the reaction of the adhesion promoter described above may also be utilised. Such condensation catalysts may be selected from organometallic catalysts comprising titanates, e.g., Tetrapropoxy titanate; zirconates, organo aluminium chelates, titanium chelates and/or zirconium chelates.

For example, titanate and Zirconate based catalysts may comprise a compound according to the general formula $Ti[OR^5]_4$ or $Zr[OR^5]_4$ where each $R^5$ may be the same or different and represents a monovalent, primary, secondary or tertiary aliphatic hydrocarbon group which may be linear or branched containing from 1 to 20 carbon atoms, alternatively 1 to 10 carbon atoms. Optionally the titanate or zirconate may contain partially unsaturated groups. Preferred examples of $R^5$ include but are not restricted to methyl, ethyl, propyl, isopropyl, butyl, tertiary butyl and a branched secondary alkyl group such as 2,4-dimethyl-3-pentyl. Preferably, when each $R^5$ is the same, $R^5$ is an isopropyl, branched secondary alkyl group or a tertiary alkyl group, in particular, tertiary butyl. Specific examples include but are not restricted to zirconium tetrapropylate and zirconium tetrabutyrate, tetra-isopropyl zirconate, zirconium (IV) tetraacetyl acetonate, (sometimes referred to as zirconium AcAc), zirconium (IV) hexafluoracetyl acetonate, zirconium (IV) trifluoroacetyl acetonate, tetrakis (ethyltrifluoroacetyl acetonate) zirconium, tetrakis (2,2,6,6-tetramethyl-heptanethionate) zirconium, zirconium (IV) dibutoxy bis(ethylacetonate), zirconium tributoxyacetylacetate, zirconium butoxyacetylacetonate bisethylacetoacetate, zirconium butoxyacetylacetonate bisethylacetoacetate, diisopropoxy bis (2,2,6,6-tetramethyl-heptanethionate) zirconium, or similar zirconium complexes having β-diketones (including alkyl-substituted and fluoro-substituted forms thereof) which are used as ligands. Titanate equivalents of the above zirconates are also included.

Suitable aluminium-based condensation catalysts may include one or more of $Al(OC_3H_7)_3$, $Al(OC_3H_7)_2(C_3COCH_2COC_{12}H_{25})$, $Al(OC_3H_7)_2(OCOCH_3)$, and $Al(OC_3H_7)_2(OCOC_{12}H_{25})$.

If deemed necessary and/or beneficial, the adhesion promoter may also include other ingredients such as other silane coupling agents, organic compounds containing two or more acrylate groups and/or reactive siloxanes.

Examples of adhesion promoters include silane coupling agents, such as methyltrimethoxysilane, vinyltrimethoxysilane, allyltrimethoxysilane, 1,6-bis(trimethylsilyl)hexane, 3-methacryloxypropyltrimethoxysilane and/or glycidoxypropyltrimethoxysilane.

When present, the one or more adhesion promoter(s) is/are typically present in the composition in a total amount of from about 0.1 to 6 wt. % of the composition; alternatively, 0.1 to 4 wt. % of the composition.

Examples of electrically conductive fillers include metal particles, metal oxide particles, metal-coated metallic particles (such as silver-plated nickel), metal coated non-metallic core particles (such as silver coated talc, or mica or quartz) and a combination thereof. Metal particles may be in the form of powder, flakes or filaments, and mixtures or derivatives thereof.

Examples of thermally conductive fillers include boron nitride, alumina, metal oxides (such as zinc oxide, iron oxide magnesium oxide, and aluminium oxide), graphite, diamond, and mixtures or derivatives thereof.

Examples of pigments include titanium dioxide, chromium oxide, bismuth vanadium oxide, iron oxides and mixtures thereof.

Examples of colourants or colouring agents which may be utilized in the hydrosilylation curable silicone compositions include pigments, vat dyes, reactive dyes, acid dyes, chrome dyes, disperse dyes, cationic dyes and mixtures thereof. The two-part moisture cure organopolysiloxane composition as described herein may further comprise one or more pigments and/or colorants which may be added if desired. The pigments and/or colorants may be coloured, white, black, metal effect, and luminescent e.g., fluorescent and phosphorescent. Pigments are utilized to colour the composition as required. Any suitable pigment may be utilized providing it is compatible with the composition herein. In two-part moisture cure organopolysiloxane compositions pigments and/or coloured (non-white) fillers e.g., carbon black may be utilized in the catalyst package to colour the end sealant product.

Suitable white pigments and/or colorants include titanium dioxide, zinc oxide, lead oxide, zinc sulfide, lithophone, zirconium oxide, and antimony oxide.

Suitable non-white inorganic pigments and/or colorants include, but are not limited to, iron oxide pigments such as goethite, lepidocrocite, hematite, maghemite, and magnetite black iron oxide, yellow iron oxide, brown iron oxide, and red iron oxide; blue iron pigments; chromium oxide pigments; cadmium pigments such as cadmium yellow, cadmium red, and cadmium cinnabar; bismuth pigments such as bismuth vanadate and bismuth vanadate molybdate; mixed metal oxide pigments such as cobalt titanate green; chromate and molybdate pigments such as chromium yellow, molybdate red, and molybdate orange; ultramarine pigments; cobalt oxide pigments; nickel antimony titanates; lead chrome; carbon black; lampblack, and metal effect pigments such as aluminium, copper, copper oxide, bronze, stainless steel, nickel, zinc, and brass.

Suitable organic non-white pigments and/or colorants include phthalocyanine pigments, e.g. phthalocyanine blue and phthalocyanine green; monoarylide yellow, diarylide yellow, benzimidazolone yellow, heterocyclic yellow, DAN orange, quinacridone pigments, e.g. quinacridone magenta and quinacridone violet; organic reds, including metallized azo reds and nonmetallized azo reds and other azo pigments, monoazo pigments, diazo pigments, azo pigment lakes, β-naphthol pigments, naphthol AS pigments, benzimidazolone pigments, diazo condensation pigment, isoindolinone, and isoindoline pigments, polycyclic pigments, perylene and perinone pigments, thioindigo pigments, anthrapyrimidone pigments, flavanthrone pigments, anthanthrone pigments, dioxazine pigments, triarylcarbonium pigments, quinophthalone pigments, and diketopyrrolo pyrrole pigments.

Typically, the pigments and/or colorants, when particulates, have average particle diameters in the range of from 10 nm to 50 μm, preferably in the range of from 40 nm to 2 μm. The pigments and/or colorants when present are present in the range of from 2, alternatively from 3, alternatively from 5 to 20 wt. % of the catalyst package composition, alternatively to 15 wt. % of the catalyst package composition, alternatively to 10 wt. % of the catalyst package composition.

In a preferred embodiment of the invention, the pigments and dyes are used in form of pigment masterbatch composed of them dispersed in component (a) at the ratio of 25:75 to 70:30.

Further additives include silicone fluids, such as trimethylsilyl or OH terminated siloxanes. Such trimethylsiloxy or OH terminated polydimethylsiloxanes typically have a viscosity of less than (<) 150 mPa·s at 25° C. When present such silicone fluid may be present in the curable silicone elastomer composition in an amount ranging of from 0.1 to 5% weight, based on the total weight of the composition.

The hydrosilylation curable silicone compositions may comprise:

- Component (A) one or more polyorganosiloxanes containing at least 2 alkenyl groups per molecule and having a viscosity in a range of 1000 mPa·s to 200,000 mPa·s at 25° C., in an amount of from 5 to 95% based on the total weight of the composition, alternatively from 35 to 85% by weight, based on the total weight of the composition, alternatively from 40 to 80% by weight based on the total weight of the composition and further alternatively from 50 to 80% by weight based on the total weight of the composition;
- Component (B), a polyorganosiloxane containing at least two or three silicon-bonded hydrogen atoms per molecule, in an amount of 0.1-40% weight of the total composition, alternatively from 0.5 to 20%, by weight of the total composition alternatively 0.5 to 10% by weight of the total composition, further alternatively from 1% to 5% by weight of the total composition;
- Component (C), at least one hydrosilylation catalyst, in an amount of 0.01-10% by weight of the total composition, alternatively 0.01% to 5% by weight of the total composition, further alternatively from 0.05% to 2% by weight of the total composition;
- Component (D), a hydrosilylation cure inhibitor consisting or comprising of one or more multiacrylate compounds comprising at least three acrylate groups per molecule is typically present in an amount of from 0.0125 to 10 wt. % of the composition alternatively from 0.0125 to 5 wt. % of the composition, alternatively from 0.025 to 3 wt. % of the composition. The total wt. % of any composition herein is 100 wt. %.

The hydrosilylation curable silicone composition as hereinbefore described is usually stored before use in two or more parts, however it may be provided as a one-part composition if desired and prepared appropriately. In the case of a two-part composition, i.e., having part (A) and part (B):

- Part (A) typically contains the catalyst (C) in addition to polyorganosiloxane (A) and filler if present, and
- Part (B) usually includes component (B) the cross-linker and polyorganosiloxane (A) and when present filler.

The utilisation of multiple part compositions before use is designed for the catalyst (C) to be stored separately from cross-linker (B) to prevent premature cure during storage. The multiacrylate compound having at least three acrylate groups per molecule of component D, described herein may be incorporated in part A or part B which is unlike many traditional hydrosilylation cure inhibitors e.g., alkynols which generally have to be retained in the part B composition to avoid agglomeration and precipitation and thus segregation of alkynol/Pt complexes with the catalyst during storage.

Optional additives, may be present in either or both part (A) or part (B) providing their presence is/are not detrimental in any way to the other ingredients present in the respective part.

The homogeneous mixing of the components of the present hydrosilylation curable silicone composition may be undertaken by using a suitable mixing means such as a kneader mixer, a Z-blade mixer, a two-roll mill (open mill), a three roll mill, a Haake™ Rheomix OS Lab mixer, a screw extruder or a twin-screw extruder or the like. Other suitable mixers include mixers sold under the SpeedMixer™ brand by Hauschild & Co KG, Germany e.g., the DC 150.1 FV, the DAC 400 FVZ and the DAC 600 FVZ may alternatively be used.

The curable hydrosilylation curable silicone compositions may be processed (or cured) by injection moulding, press moulding, extrusion moulding, transfer moulding, press vulcanization, calendaring.

The hydrosilylation curable silicone composition as hereinbefore described may be applied to the surface of a substrate by any suitable means such as rolling, spreading, 3-D printing and the like, and cured as described above. In the case of using a 3D printing method. A typical method of forming a three-dimensional (3D) article may comprise multiple steps. For example, the method may comprise (i) printing first hydrosilylation curable silicone composition as described herein with a 3D printer to form a layer. The method may further comprise (ii) heating the layer to form an at least partially cured layer. In addition, the method may comprise (iii) printing a second hydrosilylation curable silicone composition as described herein on the at least partially cured layer with the 3D printer to form a subsequent layer. The method may also comprise (iv) heating the subsequent layer to form an at least partially cured subsequent layer. Optionally, steps iii) and iv) may be repeated with independently selected curable silicone composition(s) for any additional layer(s) to form the 3D article.

After application of the hydrosilylation curable silicone composition onto the substrate, the composition is cured at the cure temperature ranging between 80° C. and 250° C. Such temperatures are generally determined by the materials involved.

The hydrosilylation curable silicone composition provided herein may be used in the preparation of a wide variety of products in various industries including, but not limited to, automotive applications, medical applications, consumer and industrial applications, electronic applications. In automotive applications, this may include housings with a silicone seal or gasket, plugs and connectors, components of various sensors, membranes, diaphragms, climate venting components, and the like. Electronic applications may include mobile phone cover seals, mobile phone accessories, precision electronic equipment, electrical switches and switch covers, watches and wristbands, wearable apparatus, e.g., facemasks, wearable electronic devices, and the like.

The hydrosilylation curable silicone composition provided herein may be used parts of mobile phones, mobile telecommunications equipment, gaming machines, clocks, image receivers, DVD equipment, MD equipment, CD equipment, and other precision electronic equipment, microwave ovens, refrigerators, electric rice cookers, TVs, thin displays of liquid crystal TVs and plasma TVs, various home appliance, copying machines, printers, facsimile machines, and other office automation (OA) equipment, connector seals, spark plug caps, components of various sensors, and other automobile components.

EXAMPLES

The following examples are provided to show the functionality of the aforementioned multiacrylates as hydrosilylation cure inhibitors. The viscosity values of the different components of the compositions used were measured using either a Brookfield™ rotational viscometer with spindle LV-4 (designed for viscosities in the range between 1,000-2,000,000 mPa·s) or a Brookfield™ rotational viscometer with spindle LV-1 (designed for viscosities in the range between 15-20,000 mPa·s) for viscosities less than 1000 mPa·s with the speed i.e. shear rate being 1 $s^{-1}$ (60 rpm). Unless otherwise indicated. All viscosities were measured at 25° C. unless otherwise indicated.

In the following examples

Masterbatch MB1 contained 70.8 wt. % of MB1 of a dimethylvinylsiloxy terminated polydimethylsiloxane having a viscosity of about 53,000 mPa·s at 25° C., and 22.4 wt. % of MB1 of a fumed silica filler having a surface area of approximately 300 $m^2/g$, the remainder being a hydrophobing treating agent. The silica was hydrophobized and contained no vinyl functionalization.

Masterbatch MB2 contained 66.6 wt. % of MB2 of a dimethylvinylsiloxy terminated polydimethylsiloxane having a viscosity of about 55,000 mPa·s at 25° C., and 25.8 wt. % of MB2 of a fumed silica filler having a surface area of approximately 300 $m^2/g$, the remainder being a hydrophobing treating agent. The silica was hydrophobized and had a vinyl functionalization of approximately 0.178 mmol/g.

Polymer A1 was a vinyldimethyl terminated polydimethylsiloxane having a viscosity of 53,000 mPa·s at 25° C.

Polymer A2 was a Vinyl terminal poly(dimethylsiloxane-co-methylvinylsiloxane) having a viscosity of 370 mPa·s at 25° C.

Crosslinker B1 was an $HMe_2SiO_{0.5}$ capped $M^HQ$ resin having 0.97 wt. % H as SiH and a viscosity of 22 mPa·s. This was an M(H) cross-linker.

Crosslinker B2 was an $Me_3SiO_{0.5}$ terminated poly(dimethyl-co-methylhydrogen)siloxane having 0.70 wt. % H as SiH and a viscosity of ~48 mPa·s at 25° C. This is a D(H) cross-linker.

The OH terminal PDMS was a hydroxy dimethyl terminated polydimethylsiloxane having viscosity of approximately 21 mPa·s.

The tetraacrylate used was Di(trimethylolpropane)tetraacrylate (depicted above).

The triacrylate used was Trimethylolpropane triacrylate (depicted above).

The diacrylate used was

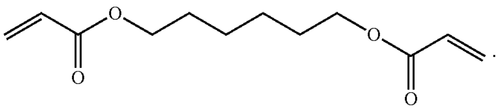

1,6-Hexanediol-diacrylate

The compositions used were prepared in two parts and then the two parts were mixed together to provide final hydrosilylation curable silicone compositions. Table 1a provides examples of the part A and part B compositions for Ex. 1, Ex. 5 and C.5. Subsequent compositions provided in Tables 1b etc are the combined part A+part B compositions after mixing.

TABLE 1a

Two-part compositions of Ex. 1, Ex. 5 and C. 5

| | Ex. 1 A | Ex. 1 B | Ex. 5 A | Ex. 5 B | C. 5 A | C. 5 B |
|---|---|---|---|---|---|---|
| Masterbatch MB1 | 17.79 | 17.37 | 17.79 | 17.37 | 17.79 | 17.37 |
| Masterbatch MB2 | 71.14 | 69.49 | 71.14 | 69.49 | 71.14 | 69.49 |
| Polymer A1 | 5.2988 | 3.80 | 5.2988 | 3.39 | 3.7576 | 0.79 |
| Polymer A2 | 4.77 | 5.34 | 4.77 | 5.34 | 4.77 | 5.34 |
| Crosslinker B1 | | 3.40 | | 3.65 | | 6.25 |
| Platinum Catalyst C | 0.0012 | | 0.0012 | | 0.0024 | |
| Inhibitor D | | | | 0.16 | | 0.16 |
| tetraacrylate | 0.40 | | 0.40 | | | |
| diacrylate | | | | | 1.94 | |
| OH terminal PDMS | 0.60 | 0.60 | 0.60 | 0.60 | 0.60 | 0.60 |

A series of examples were prepared with using part A and part B compositions similar to those shown in Table 1a. The part A and part B compositions were prepared by first mixing the two masterbatches and then adding the remaining components from each part. Once the part A and part B compositions were prepared, they could be mixed together as and when required. The compositions provided the following Tables are the combined part A and part B compositions after mixing.

TABLE 1a

| Combined Part A and Part B compositions mixed for Ex. 1 to 7 by weight % (wt. %) | | | | | | | |
|---|---|---|---|---|---|---|---|
| | Ex. 1 | Ex. 2 | Ex. 3 | Ex. 4 | Ex. 5 | Ex. 6 | Ex. 7 |
| MB1 | 17.58 | 17.58 | 17.58 | 17.58 | 17.58 | 17.58 | 17.58 |
| MB2 | 70.315 | 70.315 | 70.315 | 70.315 | 70.315 | 70.315 | 70.315 |
| Polymer A1 | 4.5494 | 3.7188 | 3.5688 | 2.2388 | 4.3844 | 3.6388 | 3.5694 |
| Polymer A2 | 5.055 | 5.055 | 5.055 | 5.055 | 5.055 | 5.055 | 5.055 |
| Crosslinker B1 (M(H)) | 1.70 | 2.30 | 2.30 | 3.13 | 1.83 | 2.30 | 2.30 |
| Karstedt's catalyst | 0.0006 | 0.0012 | 0.0012 | 0.0012 | 0.0006 | 0.0012 | 0.0006 |
| ETCH | | | 0.08 | 0.08 | 0.08 | 0.08 | 0.08 |
| tetraacrylate | 0.2 | | 0.5 | 1 | 0.2 | | 0.5 |
| triacrylate | | 0.43 | | | | 0.43 | |
| OH terminal PDMS | 0.6 | 0.6 | 0.6 | 0.6 | 0.6 | 0.6 | 0.6 |

The Examples identified in Table 1b were then tested to provide details of cure parameters Tc2, Tc60, Tc90, i.e., the time taken to reach 2%, 60% and 90% cure. These tests were conducted on a Premier MDR Moving Die Rheometer from Alpha Technologies in accordance with ASTM D5289-19a. The measurements were taken during a 10 minute cure period at 120° C.

Viscosity measurements were taken for each example after 1, 24, 48, 72 hours storage at 25° C. using a plate-plate AR2000EX rheometer from TA Instruments according to DIN 53018 with a cell gap of 500 micrometres and a shear rate of 10 $s^{-1}$ with a view to reporting the effect of the presence of the hydrosilylation cure inhibitor(s) on retarding cure of the composition. The results are provided in Table 1c below.

TABLE 1c

| Cure Parameters and Viscosity changes with time of compositions in Table 1b | | | | | | | |
|---|---|---|---|---|---|---|---|
| | Ex. 1 | Ex2 | Ex3 | Ex4 | Ex5 | Ex 6 | Ex. 7 |
| Cure @120° C.-Tc2 (s) | 35 | 23 | 38 | 47 | 35 | 35 | 75 |
| Cure @120° C.-Tc60 (s) | 68 | 35 | 54 | 78 | 68 | 51 | 107 |
| Cure @120° C.-Tc90 (s) | 126 | 54 | 76 | 120 | 126 | 77 | 146 |
| Viscosity after 1 hr (Pa · s) | 305 | 353 | 392 | 467 | 305 | 332 | 416 |
| Viscosity after 24 hrs (Pa · s) | 434 | 714 | 480 | 548 | 434 | 511 | 503 |
| Viscosity after 48 hrs (Pa · s) | 650 | 801 | 525 | 608 | 650 | 718 | 570 |
| Viscosity after 72 hrs (Pa · s) | 813 | 1317 | 553 | 604 | 813 | 792 | 632 |

Example 1 (Ex. 1) clearly shows that multiacrylates clearly function as hydrosilylation cure inhibitors. No previously acknowledged hydrosilylation cure inhibitors are present in the Ex. 1 composition and its ability to retard cure is still evident after greater than (>) 48 hours. Hence it clearly shows multiacrylates can be present as the sole hydrosilylation cure inhibitor.

The above examples were compared with a series of comparative examples, C. 1 to C. 9, the compositions for which are shown in Tables 2a and 2b below.

TABLE 2a

| Compositions of C. 1 to 6 by weight % (wt. %) | | | | | | |
|---|---|---|---|---|---|---|
| | C. 1 | C. 2 | C. 3 | C. 4 | C. 5 | C. 6 |
| MB1 | 17.58 | 17.58 | 17.58 | 17.58 | 17.58 | 17.58 |
| MB2 | 70.315 | 70.315 | 70.315 | 70.315 | 70.315 | 70.315 |
| Polymer A1 | 4.7732 | 4.1932 | 3.3432 | 4.8694 | 2.2688 | 4.3282 |

TABLE 2a-continued

| Compositions of C. 1 to 6 by weight % (wt. %) | | | | | | |
|---|---|---|---|---|---|---|
| | C. 1 | C. 2 | C. 3 | C. 4 | C. 5 | C. 6 |
| Polymer A2 | 5.05 | 5.05 | 5.05 | 5.055 | 5.055 | 5.05 |
| Crosslinker B1 (M(H)) | 0 | 0 | 0 | 1.5 | 3.13 | 0 |
| Crosslinker B2 (D(H)) | 1.65 | 2.03 | 2.58 | 0 | 0 | 1.97 |
| Karstedt's catalyst | 0.0018 | 0.0018 | 0.0018 | 0.0006 | 0.0012 | 0.0018 |
| ETCH | 0.03 | 0.03 | 0.03 | 0.08 | 0.08 | 0.000 |
| tetraacrylate | 0 | 0.2 | 0.5 | 0 | 0 | 0.2 |
| diacrylate | 0 | 0 | 0 | 0 | 0.97 | 0 |
| OH terminal PDMS | 0.6 | 0.6 | 0.6 | 0.6 | 0.6 | 0.6 |

In Table 2b the dimethacrylate used was hexandiol-dimethacrylate which has the structure:

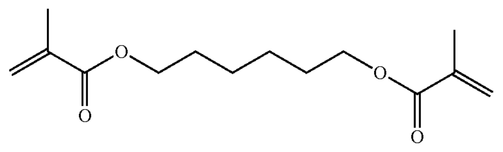 [SMILES: C=C(C)C(=O)OCCCCCCOC(=O)C(=C)C]

The trimethacrylate used was trimethylolpropane-trimethacrylate which has the structure:

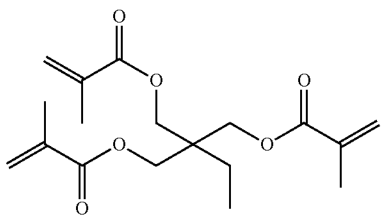 [SMILES: C=C(C)C(=O)OCC(CC)(COC(=O)C(=C)C)COC(=O)C(=C)C]

TABLE 2b

| Compositions of C. 7 to 9 by weight % (wt. %) | | | |
|---|---|---|---|
| | C. 7 | C. 8 | C. 9 |
| MB1 | 17.58 | 17.58 | 17.58 |
| MB2 | 70.315 | 70.315 | 70.315 |
| Polymer A1 | 3.5788 | 3.5188 | 3.5788 |
| Polymer A2 | 5.055 | 5.055 | 5.055 |
| Crosslinker B1 (M(H)) | 2.30 | 2.30 | 2.30 |
| Karstedt's catalyst | 0.0012 | 0.0012 | 0.0012 |

TABLE 2b-continued

| Compositions of C. 7 to 9 by weight % (wt. %) | | | |
|---|---|---|---|
| | C. 7 | C. 8 | C. 9 |
| ETCH | 0.08 | 0.08 | 0.08 |
| diacrylate | 0.49 | 0 | 0 |
| dimethacrylate | 0 | 0.55 | 0 |
| trimethacrylate | 0 | 0 | 0.49 |
| OH terminal PDMS | 0.6 | 0.6 | 0.6 |

The aforementioned comparative compositions were then also assessed for Tc2, Tc60, Tc90, and change in viscosity over time using the same test methods as indicated above and the results are provided in Tables 2c and 2d.

TABLE 2c

| Cure Parameters and Viscosity changes with time of compositions in Table 2a | | | | | | |
|---|---|---|---|---|---|---|
| | C. 1 | C. 2 | C. 3 | C. 4 | C. 5 | C. 6 |
| Cure @120° C.-Tc2 (s) | 32 | 39 | 48 | 22 | 43 | 18 |
| Cure @120° C.-Tc60 (s) | 52 | 62 | 77 | 36 | 78 | 37 |
| Cure @120° C.-Tc90 (s) | 78 | 92 | 106 | 54 | 134 | 66 |
| Viscosity after 1 hr (Pa · s) | 205 | 309 | 368 | 212 | 343 | 395 |
| Viscosity after 24 hrs (Pa · s) | 266 | 573 | 460 | 428 | gelled | gelled |
| Viscosity after 48 hrs (Pa · s) | 271 | 681 | 745 | 639 | — | — |
| Viscosity after 72 hrs (Pa · s) | 307 | gelled | gelled | gelled | — | — |

It can be seen from comparative examples C. 1, C2 and C3 that adding acrylates to a standard hydrosilylation cure silicone rubber composition using standard D(H) cross-linker, that the cure process is slowed down and the time before gelling is shortened. This problem is overcome when using the multiacrylate hydrosilylation cure inhibitor e.g., in Ex. 1.

When comparing Ex. 1 with C6, it can be seen that multiacrylates function as hydrosilylation cure inhibitors only for M(H) cross-linkers. Use in e.g., C. 6 sees the composition cured after only 24 hrs room temperature.

Ex 2 shows a viscosity of 1317 Pa·s after 3 days which is a significant improvement compared to e.g., C7 (diacrylate), which uses the same molar amount of acrylate, and despite having additional ETCH as co-inhibitor, and despite showing slower cure, is already gelled after 24 hrs.

Examples 2, 3 and 7 (Ex. 2, Ex. 3 and to Ex. 7) show that the lower rate of viscosity increase with time using the multiacrylate hydrosilylation cure inhibitors as hereinbefore described is only apparent in combination with M(H) type cross-linkers as can be seen from Ex. 3 (M(H) cross-linker and tetraacrylate) as compared to C. 3 (D(H) cross-linker and tetraacrylate). Ex. 3 provides a fast cure and slow rate of increase in viscosity with time, whilst C. 3 has a comparatively faster increase in viscosity with time.

Ex. 4 indicates that the use of higher multiacrylate loadings can be utilised to increase adhesion. Comparing Ex. 4 with C. 5 it can be seen that using the diacrylate at equimolar acryloxy concentrations leads to similar cure rate at 120° C. which is perhaps only to be expected.

TABLE 2d

Cure Parameters and Viscosity changes with time of compositions in Table 2b

| | C. 7 | C. 8 | C. 9 |
|---|---|---|---|
| Cure @120° C.-Tc2 (s) | 35 | 16 | 14 |
| Cure @120° C.-Tc60 (s) | 54 | 28 | 24 |
| Cure @120° C.-Tc90 (s) | 105 | 63 | 37 |
| Viscosity after 1 hr (Pa · s) | 395 | 300 | 290 |
| Viscosity after 24 hrs (Pa · s) | gelled | gelled | gelled |
| Viscosity after 48 hrs (Pa · s) | — | — | — |
| Viscosity after 72 hrs (Pa · s) | — | — | — |

It can be seen that the compositions in C7 to 9 were not retarded unlike those using the multiacrylate hydrosilylation cure inhibitors as described herein. This is a clear indication that diacrylates as well as multi-methacrylates do not provide a similar retarding effect on hydrosilylation process.

The invention claimed is:

1. A hydrosilylation curable silicone composition, consisting of:

(A) one or more polyorganosiloxanes, wherein the one or more polyorganosiloxanes contain at least two unsaturated groups per molecule, which unsaturated groups are selected from alkenyl and alkynyl groups, and having a viscosity in a range of 1,000 to 200,000 mPa·s at 25° C., and are free of fluoro-containing groups;

(B) a polyorganosiloxane containing at least two terminal silicon bonded hydrogen groups selected from the group consisting of branched and/or chain extended dimethylhydrogensiloxy-terminated polydimethylsiloxanes; dimethylhydrogensiloxy-terminated dimethylsiloxane-methylhydrogensiloxane copolymers; copolymers and/or silicon resins consisting of $(CH_3)_2HSiO_{1/2}$ units, $(CH_3)_3SiO_{1/2}$ units and $SiO_{4/2}$ units; copolymers and/or silicone resins consisting of $(CH_3)_2HSiO_{1/2}$ units and $SiO_{4/2}$ units; copolymers and/or silicone resins consisting of $(CH_3)_2HSiO_{1/2}$ units, $SiO_{4/2}$ units and $(C_6H_5)_3SiO_{1/2}$ units, and alternatives in which methyl is replaced by phenyl groups or other alkyl groups; tetrakis (dimethylsiloxy) silane; hydride-terminated polyphenylmethyl siloxane; hydride-terminated polyphenyl-(dimethylhydrosiloxy) siloxane; and phenyltris (dimethylsiloxy) silane;

(C) at least one hydrosilylation catalyst; and (D) a hydrosilylation cure inhibitor consisting of, a multiacrylate compound having at least three acrylate groups per molecule and selected from a triacrylate, a tetraacrylate, a pentaacrylate, a hexaacrylate, or a mixture thereof, and optionally, hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, diaziridines, or alkenyl-substituted siloxanes;

(E) optionally, one or more reinforcing fillers and/or non-reinforcing fillers;

(F) optionally, an adhesion promoter selected from monoacrylates, diacrylates, methacrylates, epoxy-containing alkoxysilanes, and methyltrimethoxysilane, vinyltrimethoxysilane, allyltrimethoxysilane, 1,6-bis(trimethylsilyl)hexane, and 3-methacryloxypropyltrimethoxysilane;

(G) optionally, pigments selected from titanium dioxide, chromium oxide, bismuth vanadium oxide, iron oxides and mixtures thereof; carbon black; zinc oxide; lead oxide; zinc sulfide, lithophone; zirconium oxide; antimony oxide; iron oxide pigments; blue iron pigments; chromium oxide pigments; cadmium pigments; bismuth pigments; mixed metal oxide pigments; chromate and molybdate pigments; ultramarine pigments; cobalt oxide pigments; nickel antimony titanates; lead chrome; lampblack; aluminium; copper; copper oxide; bronze; stainless steel; nickel; zinc; brass; phthalocyanine pigments; monoarylide yellow; diarylide yellow; benzimidazolone yellow; heterocyclic yellow; DAN orange; quinacridone pigments; azo pigments; monoazo pigments; diazo pigments; azo pigment lakes; β-naphthol pigments; naphthol AS pigments; benzimidazolone pigments; diazo condensation pigment; isoindolinone; isoindoline pigments; polycyclic pigments; perylene and perinone pigments; thioindigo pigments; anthrapyrimidone pigments; flavanthrone pigments; anthanthrone pigments; dioxazine pigments, triarylcarbonium pigments; quinophthalone pigments; and diketopyrrolo pyrrole pigments; and (H) optionally, silicone fluids selected from trimethylsilyl or OH terminated siloxanes polydimethylsiloxanes having a viscosity of less than (<) 150 mPa·s at 25° C.;

(I) optionally, one or more additives selected from adhesion catalysts, electrically conductive fillers, thermally conductive fillers, pot life extenders, flame retardants, UV light stabilizers, bactericides, wetting agents, heat stabilizers, and plasticizers, or a mixture thereof.

2. The hydrosilylation curable silicone composition in accordance with claim 1, wherein the multiacrylate compound has from three to five acrylate groups per molecule.

3. The hydrosilylation curable silicone composition in accordance with claim 1, wherein the multiacrylate compound is selected from pentaerythritol tetraacrylate, dipentaerythritol penta-/hexa-acrylate, pentaerythritol triacrylate, di (trimethylolpropane) tetraacrylate, trimethylolpropane triacrylate, or a mixture thereof.

4. The hydrosilylation curable silicone composition in accordance with claim 1, wherein the optional one or more acetylenic alcohols is/are present and is selected from 1-ethynyl-1-cyclohexanol, 2-methyl-3-butyn-2-ol, 3-butyn-1-ol, 3-butyn-2-ol, propargyl alcohol, 1-phenyl-2-propyn-1-ol, 3,5-dimethyl-1-hexyn-3-ol, 1-ethynylcyclopentanol, 3-methyl-1-penten-4-yn-3-ol, and mixtures thereof.

5. The hydrosilylation curable silicone composition in accordance with claim 1, wherein the optional one or more reinforcing fillers and/or non-reinforcing fillers is/are present in the composition.

6. The hydrosilylation curable silicone composition in accordance with claim 1, which is stored before use in two parts, a part-A comprising components (C) and (A) and optionally filler, and a part-B comprising components (B) and (A) and optionally filler, such that components (C) and (B) are stored separately.

7. The hydrosilylation curable silicone composition in accordance with claim 6, wherein the optional one or more acetylenic alcohols is/are present in part-B and is selected from 1-ethynyl-1-cyclohexanol, 2-methyl-3-butyn-2-ol, 3-butyn-1-ol, 3-butyn-2-ol, propargyl alcohol, 1-phenyl-2-propyn-1-ol, 3,5-dimethyl-1-hexyn-3-ol, 1-ethynylcyclopentanol, 3-methyl-1-penten-4-yn-3-ol, and mixtures thereof.

8. A cured silicone material which is the cured product of the hydrosilylation curable silicone composition in accordance with claim 1.

9. A method of preparing a cured silicone material by mixing the components of the hydrosilylation curable silicone composition in accordance with claim 1 and curing the composition at a temperature between 80° C. and 250° C.

10. The method in accordance with claim 9, wherein the cured silicone material is a three-dimensional (3D) article, and wherein the method further comprises:

(i) printing an amount of the hydrosilylation curable silicone composition with a 3D printer to form a layer;

(ii) heating the layer to form an at least partially cured layer;

(iii) printing a second amount of the hydrosilylation curable silicone composition on the at least partially cured layer with the 3D printer to form a subsequent layer;

(iv) heating the subsequent layer to form an at least partially cured subsequent layer; and (v) optionally, repeating steps (iii) and (iv) for any additional layer(s) to form the 3D article.

11. A hydrosilylation curable silicone composition, consisting of:

(A) one or more polyorganosiloxanes, wherein the one or more polyorganosiloxanes contain at least two unsaturated groups per molecule, which unsaturated groups are selected from alkenyl and alkynyl groups, and having a viscosity in a range of 1,000 to 200,000 mPa·s at 25° C., and are free of fluoro-containing groups;

(B) a polyorganosiloxane containing at least two terminal silicon bonded hydrogen groups selected from the group consisting of branched and/or chain extended dimethylhydrogensiloxy-terminated polydimethylsiloxanes; dimethylhydrogensiloxy-terminated dimethylsiloxane-methylhydrogensiloxane copolymers; copolymers and/or silicon resins consisting of $(CH_3)_2HSiO_{1/2}$ units, $(CH_3)_3SiO_{1/2}$ units and $SiO_{4/2}$ units; copolymers and/or silicone resins consisting of $(CH_3)_2HSiO_{1/2}$ units and $SiO_{4/2}$ units; copolymers and/or silicone resins consisting of $(CH_3)_2HSiO_{1/2}$ units, $SiO_{4/2}$ units and $(C_6H_5)_3SiO_{1/2}$ units, and alternatives in which methyl is replaced by phenyl groups or other alkyl groups; tetrakis (dimethylsiloxy) silane; hydride-terminated polyphenylmethyl siloxane; hydride-terminated polyphenyl-(dimethylhydrosiloxy) siloxane; and phenyltris (dimethylsiloxy) silane;

(C) at least one hydrosilylation catalyst; and (D) a hydrosilylation cure inhibitor consisting of, a multiacrylate compound having at least three acrylate groups per molecule and selected from a triacrylate, a tetraacrylate, a pentaacrylate, a hexaacrylate, or a mixture thereof; and optionally, hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, diaziridines, or alkenyl-substituted siloxanes;

(E) optionally, one or more reinforcing fillers and/or non-reinforcing fillers;

(F) optionally, an adhesion promoter selected from monoacrylates, diacrylates, methacrylates, epoxy-containing alkoxysilanes, and methyltrimethoxysilane, vinyltrimethoxysilane, allyltrimethoxysilane, 1,6-bis(trimethylsilyl)hexane, and 3-methacryloxypropyltrimethoxysilane;

(G) optionally, pigments selected from titanium dioxide, chromium oxide, bismuth vanadium oxide, iron oxides and mixtures thereof; carbon black; zinc oxide; lead oxide; zinc sulfide, lithophone; zirconium oxide; antimony oxide; iron oxide pigments; blue iron pigments; chromium oxide pigments; cadmium pigments; bismuth pigments; mixed metal oxide pigments; chromate and molybdate pigments; ultramarine pigments; cobalt oxide pigments; nickel antimony titanates; lead chrome; lampblack; aluminium; copper; copper oxide; bronze; stainless steel; nickel; zinc; brass; phthalocyanine pigments; monoarylide yellow; diarylide yellow; benzimidazolone yellow; heterocyclic yellow; DAN orange; quinacridone pigments; azo pigments; monoazo pigments; diazo pigments; azo pigment lakes; β-naphthol pigments; naphthol AS pigments; benzimidazolone pigments; diazo condensation pigment; isoindolinone; isoindoline pigments; polycyclic pigments; perylene and perinone pigments; thioindigo pigments; anthrapyrimidone pigments; flavanthrone pigments; anthanthrone pigments; dioxazine pigments, triarylcarbonium pigments; quinophthalone pigments; and diketopyrrolo pyrrole pigments;

(H) optionally, silicone fluids selected from trimethylsilyl or hydroxy dimethyl terminated polydimethylsiloxanes having a viscosity of less than (<) 150 mPa·s at 25° C.; and (I) optionally, one or more additives selected from adhesion catalysts, electrically conductive fillers, thermally conductive fillers, pot life extenders, flame retardants, UV light stabilizers, bactericides, wetting agents, heat stabilizers, and plasticizers, or a mixture thereof.

* * * * *